US007184941B2

(12) United States Patent
Lee

(10) Patent No.: US 7,184,941 B2
(45) Date of Patent: Feb. 27, 2007

(54) METHOD FOR SMOOTHING BOUNDARIES OF GEOMETRICAL FIGURES USING TERMINAL

(75) Inventor: Joo Haeng Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 878 days.

(21) Appl. No.: 10/093,401

(22) Filed: Mar. 11, 2002

(65) Prior Publication Data

US 2003/0128221 A1 Jul. 10, 2003

(30) Foreign Application Priority Data

Jan. 5, 2002 (KR) .................................. 2002-618

(51) Int. Cl.
*G06F 17/10* (2006.01)
(52) U.S. Cl. ......................................................... 703/2
(58) Field of Classification Search .................... 703/1, 703/2
See application file for complete search history.

(56) References Cited

FOREIGN PATENT DOCUMENTS

KR   2001-58236   7/2001

OTHER PUBLICATIONS

Snoeyink et al.; Sweeping arrangements of curves; Annual Proc. Comp. Geometry; pp. 354-363; 1989.*

Edelsbrunner et al.; Topologically sweeping an arrangement; Annual Proc. Comp. Geometry; pp. 389-403; 1986.*

Joo-Haeng Lee, et al.; Polygonal boundary approximation for a 2D general sweep based on envelope and boolean operations; Visual Computer 2000; p. 208-240.

* cited by examiner

*Primary Examiner*—Hugh Jones
(74) *Attorney, Agent, or Firm*—Mayer Brown Rowe & Maw LLP

(57) ABSTRACT

The invention relates to a boundary smoothing method of a geometrical figure using a terminal in which a smoothing operation on the boundary of the given geometrical figure is defined using sweep and unsweep operation in a process for processing the boundary of the geometrical figure using CAD system or graphic tool, thereby computing and processing the boundary at a high speed with good performance the present invention provides a boundary smoothing method of a geometrical figure that is an important geometry operation, using a terminal. The boundaries of the geometrical figure are smoothed by using the sweep and unsweep operation without a complicated mathematical operation on the boundaries of the geometrical figure, and without being subject to a step of removing a self-cross or intercross. This method allows a user to designate and control an application region of the smoothing operation and a smoothing degree. Also, the method of the present invention can be easily realized by software. Since the realized software has a high performance, if it is combined with the current CAD system, graphic tool or the like, more enhanced effect can be obtained.

5 Claims, 3 Drawing Sheets

METHOD FOR SMOOTHING BOUNDARIES OF GEOMETRICAL FIGURES USING TERMINAL

BACKGROUND OF THE INVENTION

1. Field of the Invention

The present invention relates to a boundary smoothing of a geometrical figure, and more particularly, to a boundary smoothing method of a geometrical figure using a terminal in which a smoothing operation on the boundary of the given geometrical figure is defined using sweep and unsweep operation in a process for processing the boundary of the geometrical figure using a CAD system or a graphic tool, thereby computing and processing the boundary at a high speed with good performance.

2. Description of the Related Art

Generally, smoothing operation is an essential geometrical factor in design and manufacturing process using a computer. For instance, smoothing of the boundary of geometrical figures is used to decorate fonts gracefully in industrial design appliances, to provide a special effect in movie industry appliances, and to design machinery and mold in the manufacturing industry appliances.

Conventionally, smoothing of the boundary of a geometrical figure needs to designate what degree of smoothing is applied to a region. Also, in order to computer the smoothing degree, it is needed to understand a differential property of a curve based on mathematical expression on the curve, and to apply a considerably complicated rule and computation. Especially, it is not easy to separately designate the smoothing application of the concave portion and the convex portion. In addition, a computation using differential property of a curve has a considerably large computational amount compared with the cross computation between straight lines, and is naturally sensitive to a numerical error.

Korean Patent laid open number 2001-058236 entitled "Offset curve computational method of plane object using sweep/unsweep" discloses a method for computing an offset curve of a boundary of a plane object by sequentially applying sweep/unsweep operations based on the most basic plane geometry Boolean set operation in geometry operation.

In the prior Korean Patent, the method for computing the offset curve of the plane object using sweep/unsweep includes: a first step of computing sweep by setting a boundary line P(t) of an object O, and then setting a circle A having an offset radius d; and a second step of setting an external boundary line of S obtained by the first step as an external offset curve of the object O, and an internal boundary line of S as an internal offset curve of the object O. This method is operated only based on the Boolean set operation.

Korean Patent Application number 2000-80906 entitled "Method for Extracting General Sweep Boundary Line Using Sweep-Envelop and Line Sweep Operation" is a method for extracting a boundary line of a general sweep, and it is to express a region where an object moving along a given path has passed.

The prior Korean Patent application is to extract a boundary line of a complicated general sweep by a simple approximation of the sweep-envelop instead of using a mathematically complicated differential property of the boundary line, but it does not provide any method for the sweep-unsweep.

Meanwhile, the sweep means a region where an object moved along a specific path has swept, and it is a very difficult item to extract the boundary line expressing the region. As means to solve this problem, there is known a method using the boundary line of an object and the algebraic property. However, since this method has a difficulty in inducing an equation and also has many cases that are complex and unstable in numerical computation, it can be applied to a simple problem alone.

The unsweep means a region where an object moved along a specific path sweeps always. A computational method of the unsweep is more difficult than that of the sweep, and is not well known.

SUMMARY OF THE INVENTION

Accordingly the present invention has been devised to solve the foregoing problems of the prior art, and it is an object of the invention to provide a boundary smoothing method of a geometrical figure using a terminal in which a smoothing operation on the boundary of the given geometrical figure is defined using sweep and unsweep operation at a high speed with good performance when executing the boundary smoothing of the geometrical figure using the terminal, thereby processing the defined smoothing operation.

In other words, it is the object of the present invention to provide a recording medium in which the smoothing operation is defined by the sweep and unsweep operations instead of a complex algebraic operation on the boundary line of the geometrical figure, the defined smoothing operation is applied to the given geometrical figure, thereby allowing a user to read the recording medium by using a computer in which a program for executing a method designating a smoothing degree and an application region of the smoothing is recorded in a computation of the boundary line smoothing operation of the geometrical figure that is one of the important geometrical operations.

To accomplish the above object, there is provided a method for processing a boundary line of a geometrical figure. The method comprises the steps of: designating a region of the geometrical figure for processing the boundary line; designating a smoothing factor representing a smoothing degree of the boundary line; and applying a smoothing process to the boundary line of the geometrical figure to smooth the boundary line.

Also, the smoothing process of the present invention the steps of: when the boundary is a concave region, applying a concave smoothing process to smooth the boundary; and when the boundary is a convex region, applying a convex smoothing process to smooth the boundary.

Further, the smoothing process of the present invention comprises the steps of: when the boundary is concave and convex, applying the geometrical figure to a concave smoothing process to extract a result of the boundary; and applying the result of the boundary to a convex smoothing process to smooth the concave and convex boundary.

Furthermore, the smoothing process of the present invention comprises the steps of: when the boundary is concave and convex, applying the geometrical figure to a convex smoothing process to extract a result of the boundary; and applying the result of the boundary to a concave smoothing process to smooth the concave and convex boundary.

Moreover, the smoothing process of the present invention comprises the steps of: when the boundary is concave and convex, applying the geometrical figure to a concave smoothing process to extract a result of the boundary; a first step of obtaining a difference between the geometrical figure and the result of the concave smoothing process; a second step of applying the geometrical figure to a convex smoothing process to obtain a result; and obtaining a difference between the result of the second step and the result of the first step, to smooth the boundary line of the geometrical figure.

Preferably, the concave smoothing process carries out the sweep operation for the boundary line of the geometrical figure, and applies the unsweep operation to a result of the sweep operation to smooth the boundary line.

Preferably, the convex smoothing process carries out the unsweep operation for the boundary line of the geometrical figure, and applies the sweep operation to a result of the unsweep operation to smooth the boundary line.

In accordance with another aspect of the present invention, there is provided a recording medium which is readable by a computer. The recording medium stores a method for processing a boundary line of a geometrical figure. The method comprising the steps of: selecting a region of the geometrical figure for processing the boundary line; designating a smoothing factor representing a smoothing degree of the boundary line and having a positive real number; applying a concave smoothing process to the region of the geometrical figure to smooth the boundary line; applying a convex smoothing process to the region of the geometrical figure to smooth the boundary line; and consecutively applying the concave smoothing process and the convex smoothing process to the region of the geometrical figure to smooth the boundary line.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

The following detailed description will primarily introduce basic concepts adopted as principles for realizing a fixed point multiplying apparatus using an encoded multiplicand in accordance with the invention.

Figure 1:
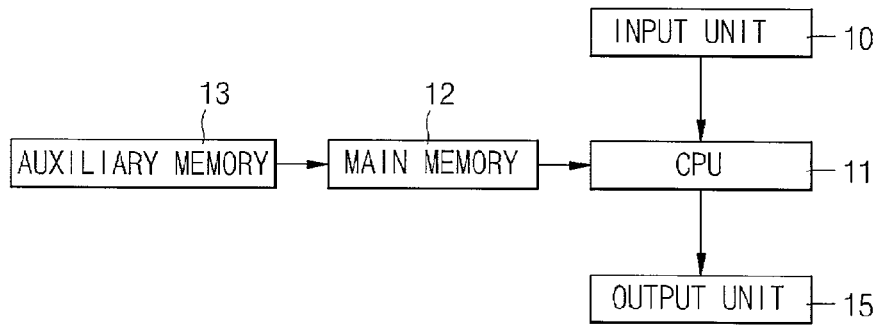
FIG. 1 is a block diagram of a terminal in accordance with an embodiment of the invention.

FIG. 1 is a block diagram of a terminal in accordance with an embodiment of the invention.

Referring to FIG. 1, the terminal includes a central processing unit (CPU) 11, a main memory 12 connected to the CPU 11, an auxiliary memory 13 connected to the main memory 12, an input unit 10 connected to the CPU 11, and an output unit 15.

Here, the CPU 11 controls and manages the whole operations of the terminal. The main memory 12 and the auxiliary memory 13 store a program executed in the CPU 11, various kinds of data used or generated during carrying out works. The input unit 10 and the output unit 15 are used for data input output with a user.

The auxiliary memory 13 functions to store massive data. The input unit 10 is comprised of a user interaction supporting input unit such as a general keyboard, a mouse, a tablet, a touch screen and the like, and the output unit 15 is comprised of a display, a printer, a video recorder and the like.

Also, the main memory 12 stores a program for morphing and controlling a geometrical figure, and the program is executed by the control of the CPU 11.

Figure 2:
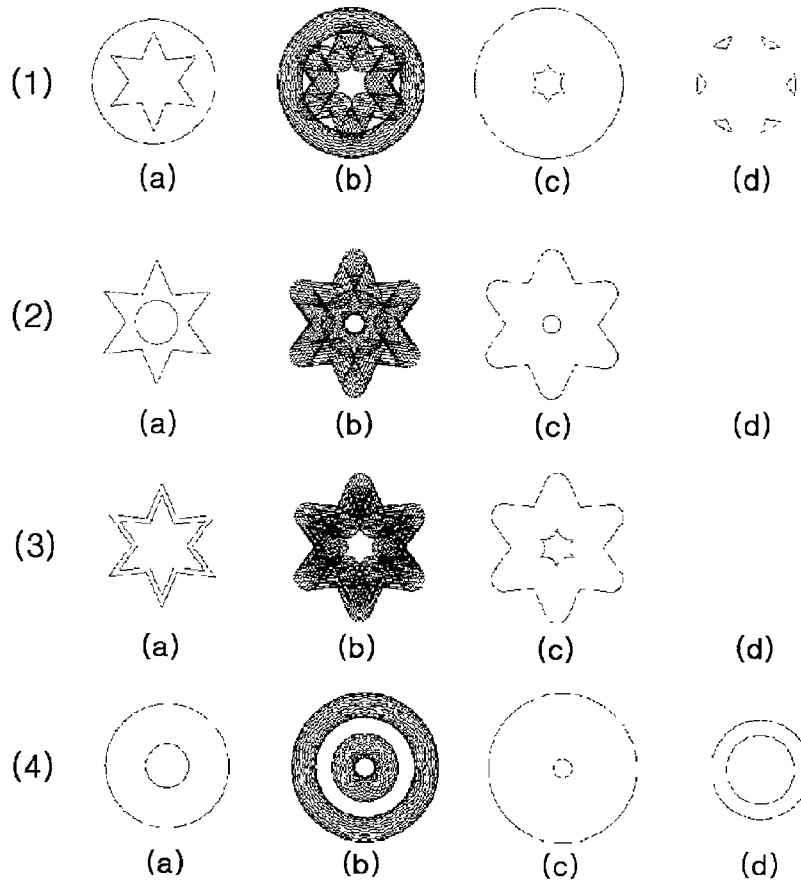
FIG. 2 is a schematic view showing examples of geometrical figures to which a method for smoothing boundaries of geometrical figures, i.e., sweep or upsweep is applied.

FIG. 2 is a schematic view showing examples of geometrical figures to which a method for smoothing a boundary line of a geometrical figure, i.e., sweep or upsweep is applied.

The sweep means a region where an object moving along a specific path has swept, and the unsweep means a region where an object moving along a specific path sweeps always. It is a difficult problem to obtain a boundary between the sweep region and the unsweep region, and the aforementioned prior arts do not provide any method for obtaining the boundary.

FIG. 2-1 is a view of a geometrical figure of which external boundary is a circle shape, and having a star shaped hole therein, and FIG. 2-1-(*a*) shows to obtain the sweep and unsweep drawings in which the boundary line is processed by applying the smoothing method of the geometrical figure in accordance with the present invention.

When moving the object of FIG. 2-1-(*a*) along the circle path as shown in FIG. 2-1-(*b*), FIG. 2-1-(*c*) shows the sweep region and FIG. 2-1-(*d*) shows the unsweep region.

FIG. 2-2 is a view of a geometrical figure of which external boundary is a star shape and having a circle shaped hole, and FIG. 2-2-(*a*) shows to obtain the sweep and unsweep drawings by applying the smoothing method of the geometrical figure in accordance with the present invention.

When moving the object of FIG. 2-2-(*a*) along the circle path as shown in FIG. 2-2-(*b*), FIG. 2-2-(*c*) shows the sweep region and FIG. 2-2-(*d*) shows the unsweep region. Especially, FIG. 2-2-(*d*) shows that the unsweep region does not exist. In other words, FIG. 2-2-(*d*) means that when an object moves along a specific path, there is no region where the object sweeps always.

Figure 3:
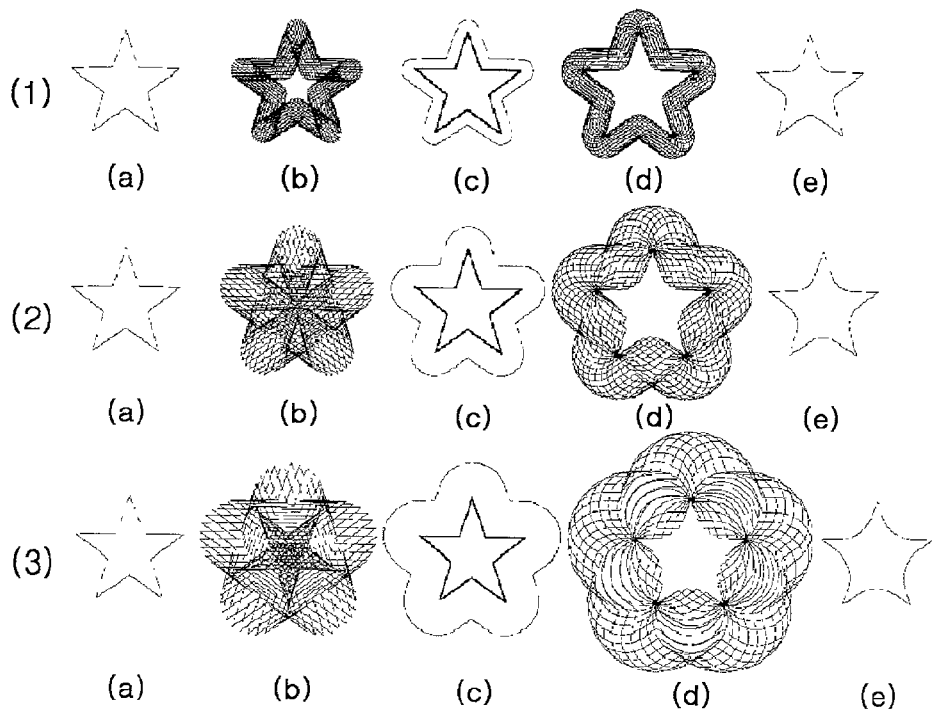
FIG. 3 is a schematic view showing examples in which a concave smoothing basic formula is applied to star shaped geometrical figures to thereby smooth concave regions.

FIG. 2-3 is a view of a geometrical figure of which external boundary is a star shape, and having a star shaped hole therein, and FIG. 2-3-(*a*) shows to obtain the sweep and unsweep drawings in which the boundary line is processed by applying the smoothing method of the geometrical figure in accordance with the present invention.

When moving the object of FIG. 2-3-(*a*) along the circle path as shown in FIG. 2-3-(*b*), FIG. 2-3-(*c*) shows the sweep region and FIG. 2-3-(*d*) shows the unsweep region. From a computation for obtaining the unsweep region, it is proved that the unsweep region does not exist in FIG. 2-3-(*d*).

Figure 4:
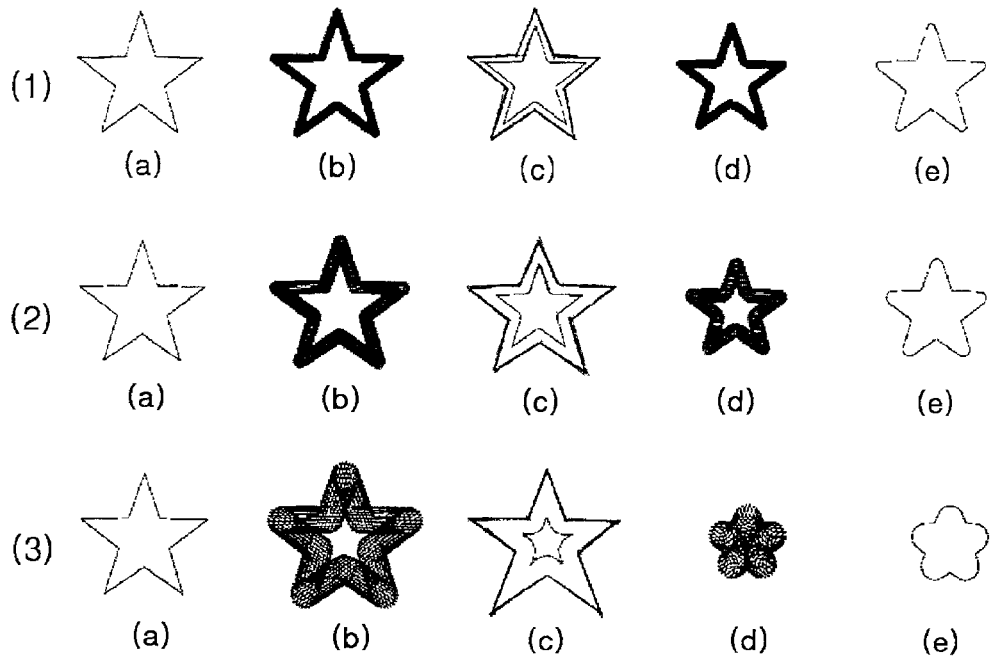
FIG. 4 is a schematic view showing examples in which a convex smoothing basic formula is applied to star shaped geometrical figures to thereby smooth convex regions.

FIG. 2-4 is a view of a geometrical figure of which external boundary is a circle shape, and having a circle shaped hole therein, and FIG. 2-4-(*a*) shows to obtain the sweep and unsweep drawings in which the boundary line is processed by applying the smoothing method of the geometrical figure in accordance with the present invention.

When moving the object of FIG. 2-4-(*a*) along the circle path as shown in FIG. 2-4-(*b*), FIG. 2-4-(*c*) shows the sweep region and FIG. 2-4-(*d*) shows the unsweep region.

In view of the smoothing degree of the boundary in the drawings of FIG. 2, FIG. 2-1-(*c*) shows that the star size becomes smaller but the concave portions are smoothed more or less. Also, FIG. 2-2-(*c*) shows that the start size becomes larger as a whole but the convex portions are smoothed more or less. Further, FIG. 2-3-(*c*) shows that the start size becomes larger as a whole but the convex portions are smoothed more or less.

Meanwhile, in case of FIG. 2-4 having a completely smooth boundary like the circle shape, the boundary maintains the smooth property even after the smoothing method of the present invention is applied to the boundary and thereby the sweep and unsweep are performed. From the above results, it is known that the boundary smoothing of the present invention has an effect on the boundary in which concave regions and convex regions are mixed.

A smoothing basic equation for a geometrical figure P can be expressed by a function S. S is a very complex nonlinear function.

$S(P, S_a, S_f)$=result of smoothing operation of $P$   Equation 1, where $S_a$ is a smoothing application region, and $S_f$ is a smoothing factor.

$S_a 0$(convex, concave, both of convex and concave)   Equation 2.

In Equation 2, the smoothing application region represented by $S_a$ indicates which region is the smoothing applied to. In other words, it indicates whether to apply the smoothing to the concave portion of an object, the convex potion, or both of the concave portion and the convex portion.

$0 < S_f < \infty$   Equation 3.

Equation 3 indicates how smooth the smoothing factor is set, and is a real number greater than zero. There is no need that the smoothing factor is overly large.

In case that a region $S_a$ to apply the smoothing is concave (i.e., Sa=concave), the sweep operation is first applied to a geometrical figure, and then unsweep operation is applied to a result of the sweep operation. In this case, the following concave smoothing basic equation 4 is used.

A geometrical figure given in the above equation 4 is first swept along the boundary of a circle having a radius of Sf. The sweeping result is unswept along the boundary of the circle having the radius of Sf.

Meanwhile, FIG. 3 shows an example for smoothing concave portions of a star figure by applying the concave smoothing basic equation of the equation 4 to a geometrical figure having the star figure.

Specifically, FIG. 3-1 shows an example for smoothing concave portions of a star figure by applying the concave smoothing basic equation to the geometrical figure having the star figure shown in FIG. 3-1-(*a*).

FIG. 3-1-(*b*) is a process for sweeping the star of FIG. 3-1-(*a*) with a circle having a radius of 0.1, and FIG. 3-1-(*c*) shows the swept result.

In FIG. 3-1-(*c*), the internal star shape coincides with the star shape of FIG. 3-1-(*a*). From the comparison of FIG. 3-1-(*a*) with FIG. 3-1-(*c*), it is known that the sweep operation makes the convex portions smooth but makes the star size larger compared with the star size of FIG. 3-1-(*a*).

FIG. 3-1-(*d*) is a process for unsweeping the resultant star of FIG. 3-1-(*c*) with a circle having a radius of 0.1, and FIG. 3-1-(*e*) shows the unswept result.

From FIG. 3-1-(*e*), it is known that the concave portions are smoothed and the convex portions still maintains the original shape of FIG. 3-1-(*a*). This corresponds to a result in which only the concave portions of the given geometrical figure are smoothed.

FIGS. 3-2 and 3-3 show examples applying the concave smoothing basic equation to the geometrical figure like FIG. 3-1, and FIGS. 3-2-(*e*) and 3-3-(*e*) are figures obtained from the smoothing.

In FIG. 3, the smoothing factor increases as it travels from FIG. 3-1 to FIG. 3-3.

As described previously, it is shown that as it travels from FIG. 3-1 to FIG. 3-3, the smoothing factor increases, and as the concave smoothing basic equation of Equation 4 is applied to the geometrical figure of the star shape, the concave portions are further smoothed.

Meanwhile, in case that the smoothing portion of a boundary line in a geometrical figure is convex, a convex smoothing basic equation is applied to thereby carry out the sweep and unsweep operation.

$$
\begin{aligned}
S(P, Sa, Sf) &= S(P, \text{convex}, Sf) \\
&= \underset{0 \le S \le 1}{I} ((S_f \cdot O_I(t)) \cdot \underset{0 \le t \le 1}{U} ((S_f \cdot O_I(t)) \cdot P) \\
&= \underset{0 \le S \le 1}{I} \left( \left( O_{sf}(s) \cdot \underset{0 \le t \le 1}{U} (O_{sf}(t)) \cdot P \right) \right) = \underset{0 \le S \le 1}{I} \left( O_{sf}(s) \cdot \underset{0 \le t \le 1}{U} P(t) \right).
\end{aligned}
$$

Equation 4

$$S(P, S_a, S_f) = S(P, \text{convex}, S_f)$$

$$= \underset{0 \le S \le 1}{I}((S_f \cdot O_I(s)) \cdot \underset{0 \le t \le 1}{U}((S_f \cdot O_I(t)) \cdot P) = \underset{0 \le S \le 1}{I}(O_{sf}(s) \cdot \underset{0 \le t \le 1}{U}(O_{sf}(t) \cdot P))$$

$$= \underset{0 \le S \le 1}{I}(O_{sf}(s) \cdot \underset{0 \le t \le 1}{U} P(t)).$$

Equation 5

In case that the smoothing portion of a boundary line in a geometrical figure is convex (i.e., Sa=convex), a convex smoothing basic equation shown in Equation 5 is applied. First, the unsweep operation is applied to the geometrical figure and then the sweep operation is applied to a result of the unsweep operation.

In the convex smoothing basic equation, a geometrical figure is first unswept along the boundary of a circle having a radius of $S_f$. The unsweeping result is swept along the boundary of the circle having the radius of $S_f$.

FIG. 4 shows an example for smoothing convex portions of a star shape by applying the convex smoothing basic equation of the equation 5 to a geometrical figure having the star shape.

Specifically, FIG. 4-1-(a) shows an example of a geometrical figure having a star shape to which the concave smoothing basic equation is being applied. FIG. 4-1-(b) is a process for unsweeping the star of FIG. 4-1-(a) with a circle having a radius of 0.1, and FIG. 4-1-(c) shows the unswept result.

In FIG. 4-1-(c), the external star shape out of the two stars coincides with the star shape of FIG. 4-1-(a). From the comparison of FIG. 4-1-(a) with FIG. 4-1-(c), it is known that when the convex smoothing basic equation is applied to the star shape, the unsweep operation makes the concave portions smooth but makes the star size smaller compared with the original star size of FIG. 4-1-(a).

FIG. 4-1-(d) is a process for sweeping the resultant star of FIG. 4-1-(c) with a circle having a radius of 0.1, and FIG. 4-1-(e) shows the unswept result. From FIG. 4-1-(e), it is known that the convex portions are smoothed and the concave portions still maintains the original shape of FIG. 4-1-(a). This corresponds to a result in which only the convex portions of the given geometrical figure are smoothed.

As described above, FIGS. 4-2 and 4-3 show examples in which the convex smoothing basic equation of Equation 5 is applied to the geometrical figure having a star shape, and thereby the unsweep and sweep operations are carried out, and FIGS. 4-2-(e) and 4-3-(e) are figures obtained from the smoothing. In FIG. 4, the smoothing factor increases as it travels from FIG. 4-1 to FIG. 4-3. It is shown that as it travels from FIG. 4-1 to FIG. 4-3, the convex portions of the stars are further smoothed.

Meanwhile, in case that a region Sa to apply the smoothing is concave and convex (i.e., Sa=both), there is a need that the concave smoothing basic equation of Equation 4 and the convex smoothing basic equation of Equation 5 should be applied together.

When the region Sa to apply the smoothing is concave and convex, there are three ways.

In a first way, the concave smoothing basic equation of Equation 4 is first applied to a geometrical figure, and the convex smoothing basic equation of Equation 5 is then applied to the application result of the concave smoothing basic equation.

In a second way, the convex smoothing basic equation of Equation 5 is first applied to a geometrical figure, and the concave smoothing basic equation of Equation 4 is then applied to the application result of the convex smoothing basic equation.

In a third way, the concave smoothing basic equation of Equation 4 and the convex smoothing basic equation of Equation 5 are independently applied to a geometrical figure to obtain two results, and the two results are applied to Equation 7 to obtain a third result as a consequence of the smoothing operation.

The aforementioned first and second ways use the following whole smoothing basic equation.

$S(P, S_a, S_f) = S(P, \text{all}, S_f) = S(S(P, \text{convex}, S_f), \text{convex},$
$S_f) = S(S(P, \text{concave}, S_f), \text{concave}, S_f)$  Equation 6.

In the above, in order to compute the convex smoothing basic equation, the unsweep operation is first carried out. At this time, since the unsweep operation results in the empty set, there is a need of notice. If the unsweep operation results in the empty set, the smoothing factor should be set in a smaller value.

The aforementioned third way uses the following whole smoothing basic equation.

$S(P, S_a, S_f) = S(P, \text{convex}, S_f) - [P - S(P, \text{concave}, S_f)]$  Equation 7.

The above equation 7 uses the following condition:

$S(P, \text{convex}, S_f) \supset P \supset S(P, \text{concave}, S_f)$.

The equation 7 subtracts the result of the concave smoothing from the original figure. In other words, the result of the concave smoothing, $[P-S(P, \text{concave}, S_f)]$ is subtracted from the result of the convex smoothing, $S(P, \text{convex}, S_f)$.

This uses that the result of the concave smoothing is always smaller than the original figure, and the result of the convex smoothing is larger than the original figure. It is regardless to separately apply the smoothing factors applied to the convex smoothing basic equation and the concave smoothing basic equation in the whole smoothing equation. In this case, since the smoothing result is influenced by a difference between two smoothing factors, there is a need of notice to select a proper value.

Figure 5:
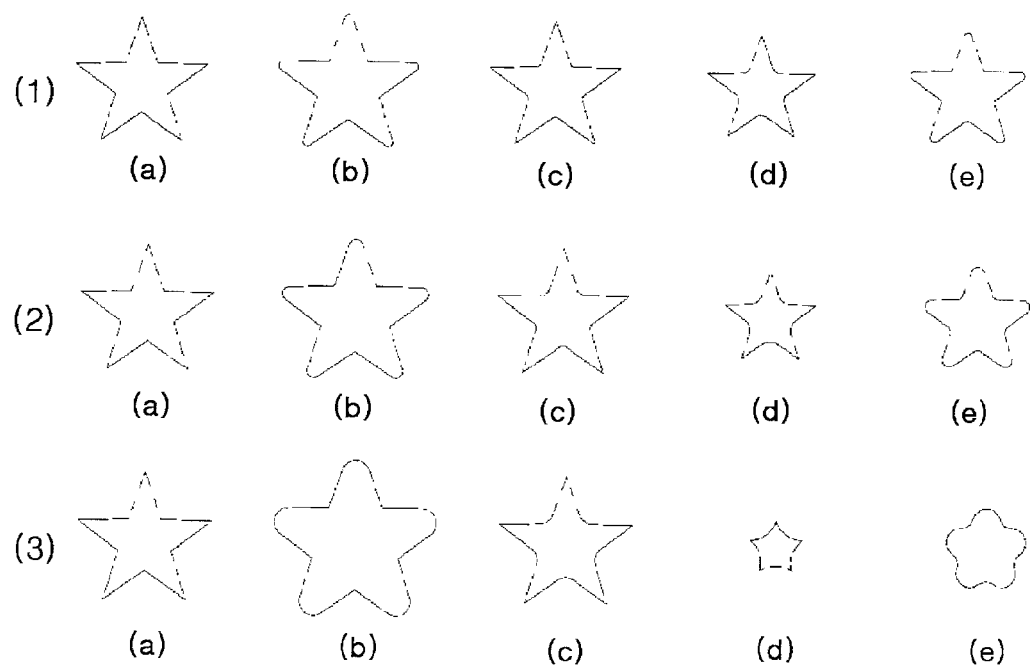
FIG. 5 is a schematic view showing examples in which the smoothing operation is applied to all the concave regions and the convex regions of objects to smooth boundaries of geometrical figures.

In the meanwhile, FIG. 5 shows smoothing results in which the concave smoothing basic equation is first applied to a geometrical figure and then the convex smoothing basic equation is applied to the result of the concave smoothing in case that the smoothing region of the geometrical figure has the concave portion and the convex portion. Specifically, FIG. 5-1-(a) shows an example of a geometrical figure having a star shape to which the operation of Equation 6 is being applied.

FIG. 5-1-(b) is a process for sweeping the star of FIG. 5-1-(a) with a circle having a radius of 0.1, and FIG. 5-1-(c) is a result which is generated by unsweeping the result of FIG. 5-1-(b) with a circle having a radius of 0.1, and is a result of the concave smoothing basic equation.

FIG. 5-1-(d) is a result which is generated by unsweeping the concave smoothing result of FIG. 5-1-(c) with a circle having a radius of 0.1. FIG. 5-1-(*e*) is a result which is generated by sweeping the result of FIG. 5-1-(*d*) with a circle having a radius of 0.1, and is a final result which is generated by applying the convex smoothing basic equation to the result of the concave smoothing basic equation. The final result shows that all regions of the star shown in FIG. 5-1-(*a*) are smoothed.

FIGS. 5-2 and 5-3 apply the aforementioned equation 6 to a geometrical figure having a star shape, so that smoothing results of FIG. 5-2-(*e*) and FIG. 5-3-(*e*) are obtained. In FIG. 5, the smoothing factor increases as it travels from FIG. 5-1 to FIG. 5-3. It is shown that as it travels from FIG. 5-1 to FIG. 5-3, all regions of the stars are further smoothed.

Figure 6:
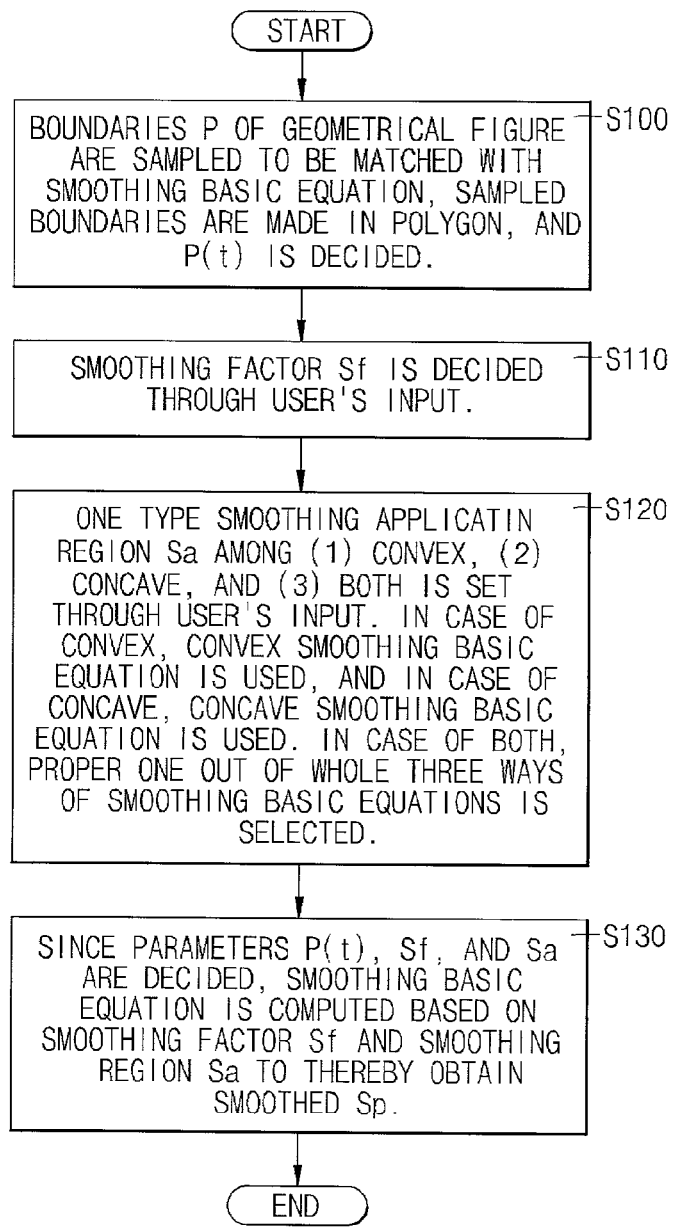
FIG. 6 is a flow chart for describing a method for smoothing boundaries of geometrical figures in accordance with the present invention.

FIG. 6 is a flow chart for describing a method for smoothing boundaries of geometrical figures in accordance with the present invention.

In step 100 (S100), boundaries P of a geometrical figure are sampled to be matched with the smoothing basic equation, the sampled boundaries are made in a polygon, and thereby P(t) is decided.

In step 110 (S110), smoothing factor $S_f$ is decided through user's input. The smoothing factor $S_f$ indicates what smoothing degree the boundaries of the geometrical figure is made in, and is set using a positive real number.

The user sets the smoothing factor $S_f$ depending on whether a selected region is a concave region, a convex region, or a region having both of the concave region and the convex region.

In step 120 (S120), in case that the selected region is the convex region, the convex smoothing basic equation is used, in case that the selected region is the concave region, the concave smoothing basic equation is used, and in case that the selected region is a concave and convex region, a whole smoothing basic equation that the concave smoothing basic equation and the convex smoothing basic equation are reordered is used.

In step 130 (S130), with the decided parameters P(t), Sf, and Sa, the smoothing basic equation is computed based on the smoothing factor Sf and the smoothing region Sa to thereby obtain a smoothed boundary.

The aforementioned method for smoothing boundaries of a geometrical figure in accordance with the present invention can be made in a program and stored in computer-readable recording media such as CD-ROM, RAM, ROM, floppy disk, hard disk, magneto-optical disk, virtual disk on the web.

As described previously, the present invention provides a boundary smoothing method of a geometrical figure that is an important geometry operation, using a terminal. The boundaries of the geometrical figure are smoothed by using the sweep and unsweep operation without a complicated mathematical operation on the boundaries of the geometrical figure, and without being subject to a step of removing a self-cross or intercross. This method allows a user to designate and control an application region of the smoothing operation and a smoothing degree.

Also, the method of the present invention can be easily realized by software or hardware. Since the realized software has a high performance, if it is combined with the current CAD system, graphic tool or the like, more enhanced effect can be obtained.

In reality, all examples provided in the present invention are obtained by the smoothing operation through the method. Especially, since a variable radius offset method computed by the method of the present invention is simple compared with an algebraic method of a curve, it is proper to implement the present invention in software or hardware.

Although the preferred embodiments of the present invention have been disclosed for illustrative purposes, those skilled in the art will appreciate that various modifications, additions and substitutions can be made without departing from the scope and spirit of the invention as defined in the accompanying claims.

What is claimed is:

1. A method for displaying a geometrical figure with a smoothed boundary line on the output unit of a terminal, the method comprising the steps of:

designating, using an input unit of the terminal, a region of the geometrical figure for processing the boundary line;

designating, using the input unit of the terminal, a smoothing factor representing a smoothing degree of the boundary line;

applying a smoothing process to the boundary line of the geometrical figure using the smoothing factor to smooth the boundary line, wherein when the boundary is a concave region, applying a concave smoothing process to smooth the boundary; and when the boundary is a convex region, applying a convex smoothing process to smooth the boundary; and displaying the geometrical figure with the smooth boundary line on the output unit of the terminal wherein the concave smoothing process carries out the sweep operation for the boundary line of the geometrical figure, and applies the unsweep operation to a result of the sweep operation to smooth the boundary line and wherein the convex smoothing process carries out the unsweep operation for the boundary line of the geometrical figure, and applies the sweep operation to a result of the unsweep operation to smooth the boundary line.

2. The method of claim 1, wherein the smoothing process comprises the steps of:

when the boundary is concave and convex, applying the geometrical figure to a concave smoothing process to extract a result of the boundary;

applying the result of the boundary to a convex smoothing process to smooth the concave and convex boundary.

3. The method of claim 1, wherein the smoothing process comprises the steps of:

applying the result of the boundary to a concave smoothing process to smooth the concave and convex boundary.

4. The method of claim 1, wherein the smoothing process comprises the steps of:

when the boundary is concave and convex, applying the geometrical figure to a concave smoothing process to extract a result of the boundary;

a first step of obtaining a difference between the geometrical figure and the result of the concave smoothing process;

a second step of applying the geometrical figure to a convex smoothing process to obtain a result; and obtaining a difference between the result of the second step and the result of the first step, to smooth the boundary line of the geometrical figure.

5. The method of claim 1, wherein the smoothing factor is set by a positive real number.

* * * * *